United States Patent
Hilbert (10) Patent No.: US 11,392,783 B2
(45) Date of Patent: Jul. 19, 2022

(54) RFID PRINTER-ENCODER HAVING A MULTI-MODE ACTIVE ANTENNA

(71) Applicant: AVX Antenna, Inc., San Diego, CA (US)

(72) Inventor: Jeffrey L. Hilbert, Las Vegas, NV (US)

(73) Assignee: KYOCERA AVX Components (San Diego), Inc., San Diego, CA (US)

( * ) Notice: Subject to any disclaimer, the term of this patent is extended or adjusted under 35 U.S.C. 154(b) by 0 days.

(21) Appl. No.: 17/198,593

(22) Filed: Mar. 11, 2021

(65) Prior Publication Data

US 2021/0286960 A1  Sep. 16, 2021

Related U.S. Application Data

(60) Provisional application No. 62/988,476, filed on Mar. 12, 2020, provisional application No. 62/993,873, filed on Mar. 24, 2020.

(51) Int. Cl.
| | | |
|---|---|---|
| *G06K 7/00* | (2006.01) | |
| *G06K 7/08* | (2006.01) | |
| *G06K 7/10* | (2006.01) | |
| *G06K 17/00* | (2006.01) | |

(52) U.S. Cl.
CPC ....... *G06K 7/10336* (2013.01); *G06K 7/0008* (2013.01); *G06K 17/0025* (2013.01)

(58) Field of Classification Search
CPC ............. G06K 7/0008; G06K 7/10316; G06K 7/10336; G06K 7/10435; G06K 7/10346; G06K 19/07786; G06K 17/0025
See application file for complete search history.

(56) References Cited

U.S. PATENT DOCUMENTS

| | | | |
|---|---|---|---|
| 7,839,287 B2 | 11/2010 | Tsirline et al. | |
| 8,306,474 B2 | 11/2012 | Borisov et al. | |
| 8,878,652 B2 | 11/2014 | Tsirline et al. | |
| 9,287,624 B2 | 3/2016 | Wan et al. | |
| 9,917,476 B2 | 3/2018 | Hedberg et al. | |
| 9,994,043 B2 | 6/2018 | Tsirline et al. | |
| 2007/0014615 A1* | 1/2007 | Kasayama | G06K 17/0025 400/76 |
| 2007/0262870 A1* | 11/2007 | Kawai | G06K 7/10336 340/572.7 |
| 2008/0093027 A1* | 4/2008 | Niwa | B41J 3/4075 156/387 |
| 2008/0240828 A1* | 10/2008 | Toda | B41J 3/50 400/76 |

(Continued)

OTHER PUBLICATIONS

RFID Labeling Reference Manual, ManualSL5R Energy Star™, SL4M™ MP2, and SL4M Short Pitch RFID Smart Label Printers, Printronix, 144 pages.

*Primary Examiner* — Tuyen K Vo
(74) *Attorney, Agent, or Firm* — Dority & Manning, P.A.

(57) ABSTRACT

A radio-frequency identification (RFID) printer-encoder is provided. The RFID printer-encoder includes a feed path configured to accommodate a plurality of RFID tags. The RFID printer-encoder further includes a print head positioned along the feed path. Furthermore, the RFID printer-encoder includes a multi-mode active antenna configurable in a plurality of antenna modes. Each of the plurality of antenna modes has a distinct radiation pattern.

17 Claims, 7 Drawing Sheets

(56) References Cited

U.S. PATENT DOCUMENTS

2009/0002746 A1* 1/2009 Niwa .................... B41J 3/4075
358/1.15
2018/0165487 A1* 6/2018 Hori ......................... G06K 1/20

* cited by examiner

RFID PRINTER-ENCODER HAVING A MULTI-MODE ACTIVE ANTENNA

PRIORITY CLAIM

The present application claims the benefit of priority of U.S. Provisional App. No. 62/988,476, titled "RFID Printer-Encoder Having a Multi-Mode Active Antenna," having a filing date of Mar. 12, 2020, which is incorporated by reference herein. The present application also claims the benefit of priority of U.S. Provisional App. No. 62/993,873, titled "RFID Printer-Encoder Having a Multi-Mode Active Antenna," having a filing date of Mar. 24, 2020, which is incorporated by reference herein.

FIELD

The present disclosure relates generally to RFID printer-encoders.

BACKGROUND

RFID printer-encoders can be used to print indicia (e.g., QR code, barcode, etc.) for a plurality of RFID tags having different shapes (e.g., geometries) and encoding requirements. RFID printer-encoders can also include an antenna array that can be used to communicate data associated with encoding each of the plurality of RFID tags. In some instances, the antenna array can include a plurality of antenna elements that can be selectively activated. In such instances, certain antenna elements of the antenna array can be activated based on the position of the active area of a RFID tag relative to the antenna array to facilitate communication between the RFID tag and the antenna array.

SUMMARY

Aspects and advantages of embodiments of the present disclosure will be set forth in part in the following description, or may be learned from the description, or may be learned through practice of the embodiments.

In one aspect, a radio-frequency identification (RFID) printer-encoder is provided. The RFID printer-encoder includes a feed path configured to accommodate a plurality of RFID tags. The RFID printer-encoder further includes a print head positioned along the feed path. Furthermore, the RFID printer-encoder includes a multi-mode active antenna configurable in a plurality of antenna modes. Each of the plurality of antenna modes has a distinct radiation pattern.

In another aspect, a method for encoding RFID tags using a RFID printer-encoder having a multi-mode active antenna configurable in a plurality of antenna modes is provided. The method includes providing a sheet on a feed path of the RFID printer-encoder, the sheet including at least a first RFID tag and a second RFID tag. The method includes configuring, by one or more control devices, the multi-mode active antenna in a first antenna mode of the plurality of antenna modes to transmit a signal associated with encoding the first RFID tag. The method includes configuring, by the one or more control devices, the multi-mode active antenna in a second antenna mode of the plurality of antenna modes to transmit a signal associated with encoding the second RFID tag. When the multi-mode active antenna is configured in the first antenna mode, the multi-mode antenna has a first radiation pattern. Furthermore, when the multi-mode active antenna is configured in the second antenna mode, the multi-mode active antenna has a second radiation pattern that is different than the first radiation pattern.

In yet another aspect, a method for controlling operation of a multi-mode active antenna of a RFID printer-encoder is provided. The method includes obtaining, by one or more control devices, data indicative of one or more parameters associated with a RFID tag positioned along a feed path of the RFID printer-encoder. The method includes determining, by the one or more control devices, a selected antenna mode for the multi-mode active antenna from a plurality of antenna modes in which the multi-mode active antenna is configurable based, at least in part, on the data, each of the plurality of antenna modes having a distinct radiation pattern. The method includes configuring, by the one or more control devices, the multi-mode active antenna in the selected antenna mode. The method includes transmitting, via the multi-mode active antenna, one or more signals to the RFID tag when the multi-mode active antenna is configured in the selected antenna mode, the one or more signals associated with encoding the RFID tag.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to RFID printer-encoders. RFID printer-encoders can include a feed path configured to accommodate a plurality of RFID tags. In some implementations, one or more of the plurality of RFID tags can be passive RFID tags. Alternatively or additionally, one or more of the plurality of RFID tags can be active RFID tags. RFID printer-encoders can include a print head. The print head can be positioned along the feed path and can be configured to print indicia (e.g., QR code, barcode, etc.) that is unique to each of the plurality of RFID tags.

RFID printer-encoders according to example aspects of the present disclosure can include a multi-mode active antenna to facilitate communication with the plurality of RFID tags. The multi-mode active antenna can be positioned along the feed path. In particular, the multi-mode active antenna can be positioned between the print head and a forward end of the feed path. The multi-mode active antenna can be configurable in a plurality of antenna modes. Furthermore, the multi-mode active antenna can have a distinct radiation pattern when configured in each of the plurality of antenna modes. As will be discussed below in more detail, a selected antenna mode of operation for the multi-mode active antenna can be determined for each of the plurality of RFID tags to encode information into the RFID tags.

In some implementations, one or more control devices can be configured to obtain data indicative of one or more parameters associated with a RFID tag of the plurality of RFID tags to be programmed using the RFID printer-encoder. For example, the data indicative of the one or more parameters of the RFID tag can include data indicative of the type of the RFID tag. In some implementations, the data indicative of the type of the RFID tag can include data indicative of the size of the RFID tag or geometry of the RFID tag. It should be appreciated, however, that any suitable type of data indicative of the type of the RFID tag can be used. For instance, in some implementations, the data indicative of the type of the RFID tag can include data indicative of encoding requirements associated with the RFID tag. Alternatively and/or additionally, the data indicative of the type of the RFID tag can include data indicative of a type of material (e.g., plastic) of the RFID tag.

In some implementations, the data indicative of the one or more parameters of the RFID tag can include data indicative of a channel quality indicator associated with a communication link between the multi-mode active antenna and the RFID tag (e.g., active RFID tag). Examples of the channel quality indicator can include at least one of a received signal strength indicator, a signal-to-noise ratio (SNR), a signal-to-interference-plus-noise ratio (SINR), a magnitude error ratio, an error vector magnitude, a bit error rate, a block error rate, and a packet error rate.

In some implementations, an antenna mode of the plurality of antenna modes for the multi-mode active antenna can be assigned to each of the plurality of RFID tags based, at least in part, on the data indicative of the one or more parameters (e.g., type). For example, a first antenna mode can be assigned to a first RFID tag having a first shape and/or encoding requirement. Conversely, a second antenna mode can be assigned to a second RFID tag that is different than the first type of RFID tag. For instance, the second RFID tag can have a second shape that is different than the first shape. Alternatively, or additionally, the second RFID tag can have encoding requirements that are different than the encoding requirements associated with the first RFID tag. In some implementations, a look-up table stored on one or more memory devices associated with the RFID printer-encoder can be populated with the selected antenna mode for each of the plurality of RFID tags.

The one or more control devices can be further configured to determine the selected antenna mode of operation for the multi-mode active antenna to communicate with each of the RFID tags based, at least in part, on the data indicative of the one or more parameters associated with each of the RFID tags. For instance, in some implementations, the one or more control devices can access the look-up table stored on the one or more memory devices to determine the selected antenna mode for each of the plurality of RFID tags. For example, the look-up table can, as discussed above, indicate the multi-mode active antenna is to be configured in a first antenna mode of the plurality of antenna modes to program the first RFID tag included in the plurality of RFID tags. Alternatively, the look-up table can indicate the multi-mode active antenna is to be configured in a second antenna mode of the plurality of antenna modes to program the second RFID tag included in the plurality of RFID tags.

When the multi-mode active antenna is configured in the first mode, the radiation pattern of the multi-mode active antenna is steered such that that the radiation pattern is pointed towards the first RFID tag. Furthermore, in some implementations, a null associated with the radiation pattern of the multi-mode active antenna when configured in the first mode of the plurality of RFID tags can be steered towards the second RFID tag that is positioned adjacent the first RFID tag on the feed path. In this manner, inadvertent programming of the second RFID tag while the first RFID tag is being programmed can be avoided.

RFID printer-encoders according to example aspects the present disclosure can provide numerous technical benefits. For instance, as mentioned above, the multi-mode active antenna of the RFID printer-encoder can be configured in a plurality of different antenna modes based, at least in part, on one or more parameters associated with a RFID tag positioned along the feed path of the RFID printer-encoder. In this manner, one of the plurality of antenna modes can be selected based, at least in part, on the one or more parameters associated with the RFID tag such that the radiation pattern of the multi-mode active antenna is steered towards the RFID tag to improve a communication link between the RFID tag and the multi-mode active antenna. Accordingly, since the multi-mode active antenna is configurable in a plurality of different antenna modes to steer the radiation pattern associated with the multi-mode active antenna, RFID printer-encoders in accordance with the present disclosure do not require an array of antenna found in conventional RFID printer-encoders.

Figure 1:
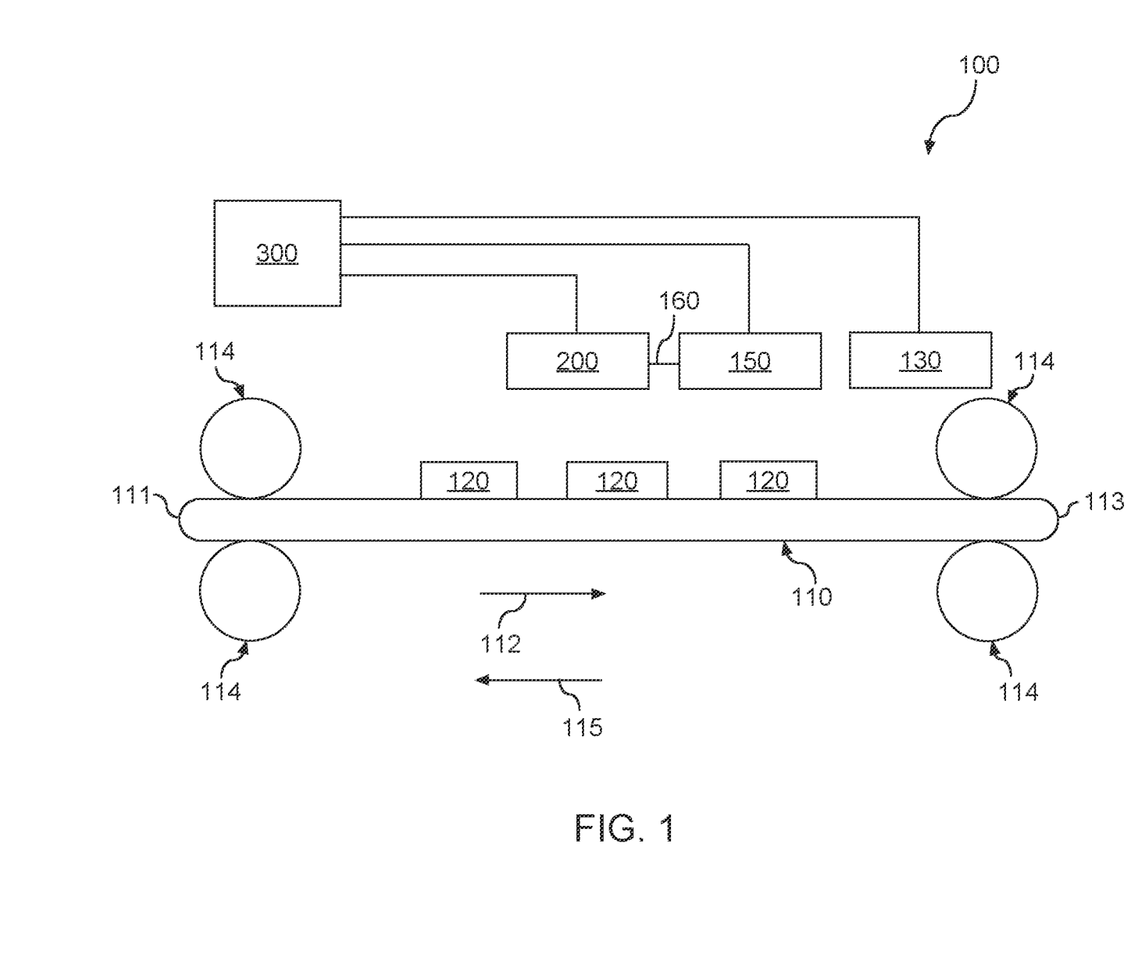
FIG. 1 depicts a schematic of a RFID printer-encoder according to example embodiments of the present disclosure.

Referring now to the FIGS., FIG. 1 depicts a RFID printer-encoder 100 according to example embodiment of the present disclosure. As shown, the RFID printer-encoder 100 can include a feed path 110 configured to accommodate a plurality of RFID tags 120. As shown, the feed path 110 can extend between a forward end 111 and an aft end 113. The plurality of RFID tags 120 can move along the feed path 110 from the forward end 111 to the aft end 113 in a direction of travel (e.g., indicated by arrow 112). In some implementations, the RFID printer-encoder 100 can include rollers 114. The rollers 114 can be configured to rotate in a first direction (e.g., clockwise) to move the plurality of RFID tags 120 along the feed path 110 in the direction of travel. However, in some implementations, the rollers 114 can be configured to rotate in a second direction (e.g., counterclockwise) to move the plurality of RFID tags 120 along the feed path in a different direction of travel (e.g., indicated by arrows 115). For instance, in some implementations, the rollers 114 can be configured to rotate in the second direction subsequent to the RFID tags 120 being programmed such that the indicia can be printed onto the plurality of RFID tags 120.

In some implementations, the RFID printer-encoder 100 can include a print head 130 positioned along the feed path 110. The print head 130 can be configured to print indicia (e.g., quality recognition (QR) code, barcode, etc.) for each of the plurality of RFID tags 120. In some implementations, a thermal ribbon (not shown) can be positioned along the feed path 110 between the print head 130 and the plurality of RFID tags 120. In such implementations, the print head 130 can be configured to heat up and press the portion of the thermal ribbon onto each of the plurality of RFID tags 120. Furthermore, the print head 130 can be configured to print indicia onto the portion of the thermal ribbon pressed onto each of the plurality of RFID tags 120. In alternative implementations, the print head 130 can be configured to print the indicia directly onto the plurality of RFID tags 120.

It should be understood that the indicia is unique for each of the plurality of RFID tags 120. For instance, the indicia associated with a first RFID tag of the plurality of RFID tags 120 is different than the indicia associated with a second RFID tag of the plurality of RFID tags 120. In this manner, the indicia can be used to distinguish between the first RFID tag and the second RFID tag.

In some implementations, the RFID printer-encoder 100 can include a RFID device 150 configured to communicate with the plurality of RFID tags 120 over any suitable wireless communications link. For example, the RFID device 150 can obtain data from one or more of the RFID tags 120 via the wireless communications link. Alternatively, or additionally, the RFID device 150 can transmit one or more signals to one or more of the RFID tags 120 via the wireless communications link. In some implementations, the RFID device 150 can be a passive RFID read/write device.

As shown, the RFID printer-encoder 100 can include a multi-mode active antenna 200. In some implementations, the multi-mode active antenna 200 can be positioned along the feed path 110. For instance, the multi-mode active antenna 200 is shown as being positioned forward of the print head 130 along the feed path 110. More specifically, the multi-mode active antenna 200 can be positioned along the feed path 110 between the print head 130 and the forward end 111 of the feed path 110. It should be appreciated, however, that the multi-mode active antenna 200 can be positioned at any suitable position along the feed path 110. For instance, in some implementations, the multi-mode active antenna 200 can be positioned aft of the print head 130 along the feed path 110. As will be discussed below in more detail, the RFID device 150 can be communicatively coupled to the multi-mode active antenna 200 of the RFID printer-encoder 100 to facilitate communication between the RFID device 150 and the plurality of RFID tags 120.

In some implementations, the RFID device 150 can transmit one or more signals to one or more of the RFID tags 120 via the multi-mode active antenna 200. For instance, the one or more signals can be associated with writing data to one or more memory devices associated with one or more of the RFID tags 120. Alternatively or additionally, the RFID device 150 can obtain data from one or more of the RFID tags 120 via the multi-mode active antenna 200. In some implementations, the RFID device 150 can be communicatively coupled to the multi-mode active antenna 200 via a communications link 160. In some implementations, the communications link 160 can be a wired communications link. For instance, the communications link 160 can be a coaxial cable. As will be discussed below in more detail, operation of the multi-mode active antenna 200 can be controlled to improve a communication link between the multi-mode active antenna 200 and the plurality of RFID tags 120.

Figure 2:
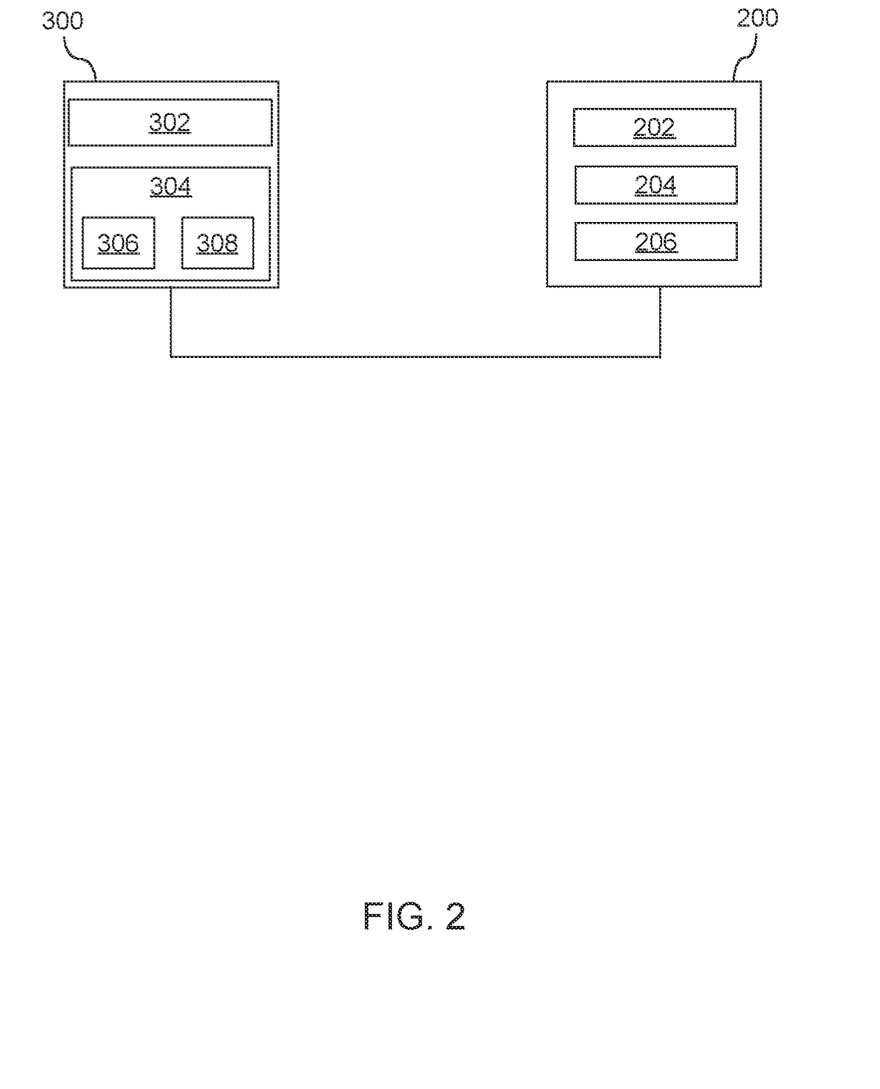
FIG. 2 depicts a block diagram of components of a RFID printer-encoder according to example embodiments of the present disclosure.
Figure 3:
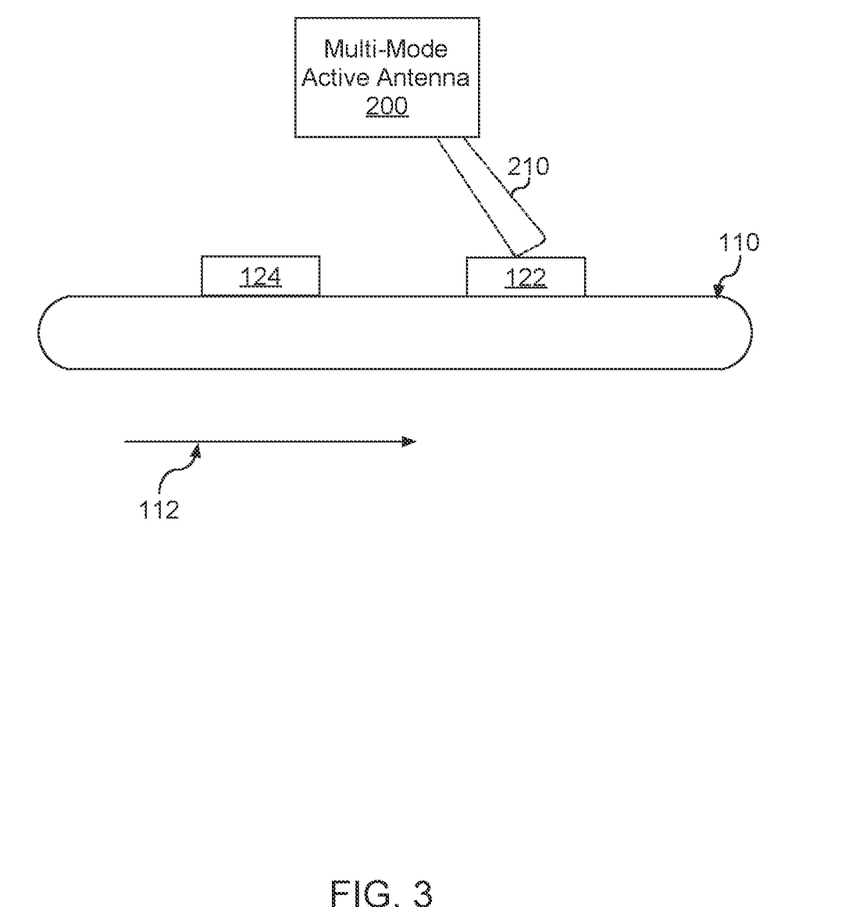
FIG. 3 depicts a multi-mode active antenna of a RFID printer-encoder configurable in a first antenna mode of a plurality of different antenna modes to program a first RFID tag according to example embodiments of the present disclosure.
Figure 4:
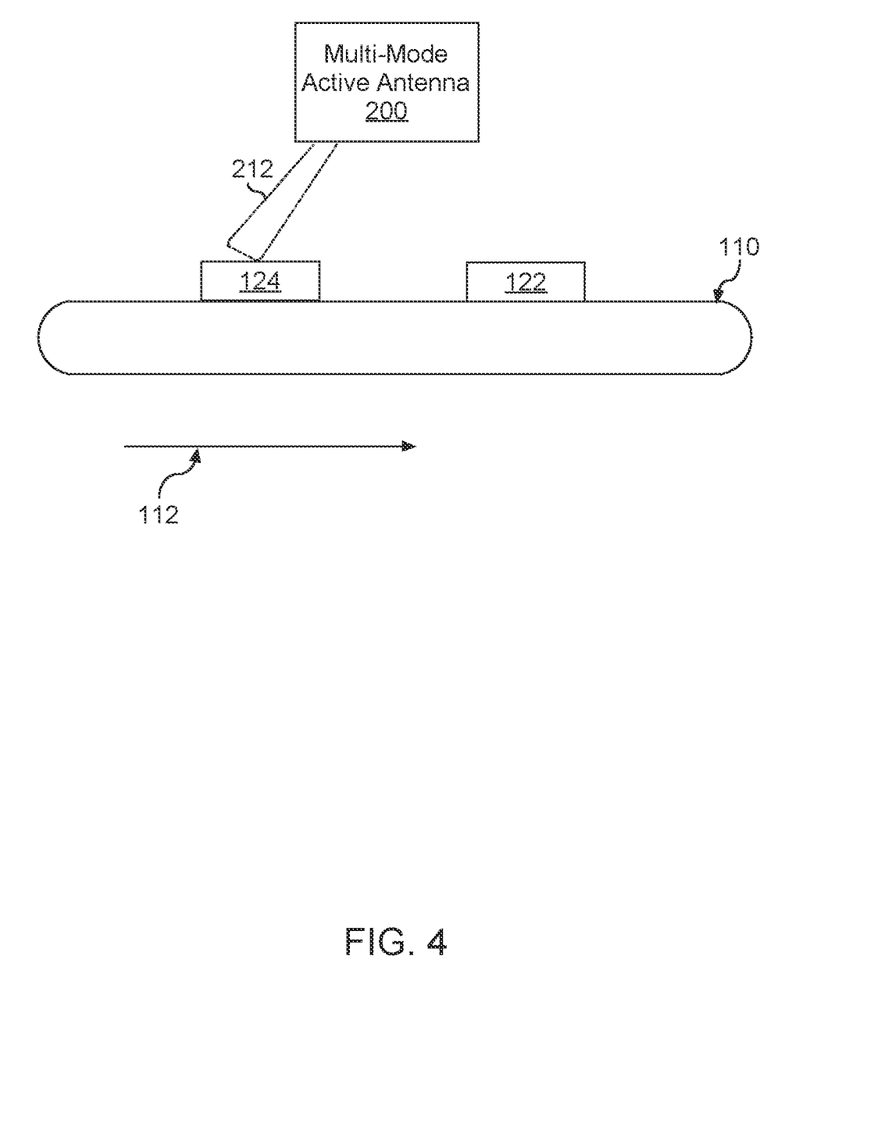
FIG. 4 depicts a multi-mode active antenna of a RFID printer-encoder configurable in a second antenna mode of a plurality of different antenna modes to program a second RFID tag according to example embodiments of the present disclosure.

Referring now to FIGS. 2 through 4, the multi-mode active antenna 200 can include a driven antenna element 202 and a parasitic antenna element 204. In some implementations, the driven antenna element 202 can be communicatively coupled to the RFID device 150 via the wired communications link 160. The multi-mode active antenna 200 can further include a tuning element 206. The tuning element 206 can be configured to adjust a reactance of the parasitic antenna element 204. In some implementations, the tuning element 206 can be a switching device operable to selectively couple the parasitic antenna element 204 to one of a plurality of different loads to adjust the reactance of the parasitic antenna element 204. It should be appreciated, however, that the tuning element 206 can include any suitable device configured to adjust the reactance of the parasitic antenna element 204. For instance, the tuning element 206 can include, without limitation, at least one of a tunable capacitor, a MEMS device, a tunable inductor, a tunable phase shifter, a field-effect transistor, or a diode.

Adjusting the reactance of the parasitic antenna element 204 via the tuning element 206 can adjust (e.g., shift) the radiation pattern of the driven antenna element 202. In this manner, the reactance of the parasitic antenna element 204 can be adjusted to steer the radiation pattern of the driven antenna element 202. Steering the radiation pattern of the driven antenna element 202 can be referred to as "beam steering." Furthermore, in instances in which the radiation pattern of the driven antenna element 202 includes a null, the reactance of the parasitic antenna element 204 can be altered to steer the null of the radiation pattern to reduce or eliminate interference between the multi-mode active antenna 200 and a client device (e.g., one of the RFID tags 120).

Furthermore, the multi-mode active antenna 200 can be configurable in a plurality of different antenna modes via adjustments to the reactance of the parasitic antenna element 204. For instance, the multi-mode active antenna 200 can be configured in a first antenna mode of the plurality of antenna modes when the parasitic antenna element 204 has a first value. Conversely, the multi-mode active antenna 200 can be configured in a second antenna mode of the plurality of antenna modes when the parasitic antenna element 204 has a second value that is different than the first value.

It should be appreciated that the multi-mode active antenna 200 can be configured in any number of different antenna modes. For instance, in some implementations, the multi-mode active antenna 200 can be configured in four different antenna modes. It should also be appreciated that the multi-mode active antenna 200 can have a distinct radiation pattern when configured in each of the plurality of antenna modes. For instance, the multi-mode active antenna 200 can have a first radiation pattern when the multi-mode active antenna 200 is configured in the first antenna mode. Conversely, the multi-mode active antenna 200 can have a second radiation pattern that is different than the first radiation pattern when the multi-mode active antenna 200 is configured in the second antenna mode. More specifically, a near-field of the first radiation pattern can be different than a near-field of the second radiation pattern. As will be discussed below in more detail, operation of the multi-mode active antenna 200 can be controlled to steer the radiation pattern of the driven antenna element 202 towards an RFID tag of the plurality of RFID tags 120 (FIG. 1).

As shown, the RFID printer-encoder 100 (FIG. 1) can include one or more control devices 300. The one or more control devices 300 can include one or more processors 302 and one or more memory devices 304. The one or more processors 302 can include any suitable processing device, such as a microprocessor, microcontroller, integrated circuit, logic device, or other suitable processing device. The one or more memory devices 304 can include one or more computer-readable media, including, but not limited to, non-transitory computer-readable media, RAM, ROM, hard drives, flash drives, or other memory devices.

The one or more memory devices 304 can store information accessible by the one or more processors 302, including computer-readable instructions 306 that can be executed by the one or more processors 302. The computer-readable instructions 306 can be any set of instructions that, when executed by the one or more processors 302, cause the one or more processors 302 to perform operations, such as controlling operation of the print head 130 and/or the multi-mode active antenna 200. The computer-readable instructions 306 can be software written in any suitable programming language or may be implemented in hardware.

In some implementations, the one or more control devices 300 can be configured to obtain data indicative of one or more parameters associated with a first RFID tag 122 of the plurality of RFID tags 120 (FIG. 1) to be programmed (e.g., encoded) via the multi-mode active antenna 200 of the RFID printer-encoder 100. As an example, the data indicative of the one or more parameters can include user-input indicative of a type of the first RFID tag 122 of the plurality of RFID tags 120. It should be understood that the user-input indicative of the type of the first RFID tag 122 can be indicative of the size and/or geometry of the first RFID tag 122. Alternatively and/or additionally, the user-input indicative of the type of the first RFID tag 122 can be associated with encoding requirements for the first RFID tag 122.

It should be appreciated that the user-input indicative of the type of the first RFID tag 122 can be obtained via any suitable method. For instance, in some implementations, the user-input can be obtained via user-manipulation of one or more input devices (e.g., buttons, touchscreen, etc.) associated with the RFID printer-encoder 100. Alternatively, the user input can be obtained via a mobile computing device (e.g., smartphone, laptop, etc.) communicatively coupled to the RFID printer-encoder via a wired or wireless communication link.

In some implementations, the one or more control devices 300 can be communicatively coupled to the RFID device 150 via any suitable wired or wireless communications link. In such implementations, the one or more control devices 300 can obtain data indicative of one or more parameters associated with the first RFID tag 122. More specifically, the data indicative of the one or more parameters associated with the first RFID tag 122 can include data indicative of a channel quality indicator (CQI) associated with a wireless communication link between the multi-mode active antenna 200 and the first RFID tag 122.

It should be appreciated that examples of data indicative of the CQI associated with the wireless communication link between the multi-mode active antenna 200 and the first RFID tag 122 can include at least one of a received signal strength indicator (RSSI), a signal to noise ratio (SNR), a signal-to-interference-plus-noise ratio (SINR), a magnitude error ratio (MER), an error vector magnitude (EVM), a bit error rate (BER), a block error rate (BLER), and a packet error rate (PER). In some implementations, the one or more control devices 300 can obtain the data indicative of the CQI associated with the wireless communication link between the multi-mode active antenna 200 and the first RFID tag 122 can be obtained in real-time or near real-time.

The one or more control devices 300 can be configured to determine a selected antenna mode of operation for the multi-mode active antenna 200 from the plurality of different antenna modes in which the multi-mode active antenna 200 is configurable based, at least in part, on the data indicative of the one or more parameters associated with the first RFID tag 122 of the plurality of RFID tags 120. For instance, in some implementations, the one or more control devices 300 can access a look-up table 308 stored on the one or more memory devices 304 to determine a selected antenna mode in which the multi-mode active antenna 200 is to be configured to program each of the plurality of RFID tags 120. For instance, the look-up table 308 can indicate the multi-mode active antenna 200 is to be configured in a first antenna mode of the plurality of antenna modes to program the first RFID tag 122. Conversely, the look-up table 308 can indicate the multi-mode active antenna 200 is to be configured in a second antenna mode of the plurality of antenna modes to program a second RFID tag 124 of the plurality of RFID tags 120. It should be appreciated that, in some implementations, the look-up table 308 can be populated with the selected antenna mode for each of the plurality of RFID tags 120 based, at least in part, on user-input provided by the user as discussed above.

In some implementations, the one or more control devices 300 can be configured to provide one or more control signals associated with configuring the multi-mode active antenna 200 in the first antenna mode (e.g., selected antenna mode) of the plurality of antenna modes in which the multi-mode active antenna 200 is configurable. More specifically, the one or more control signals can be provided to the tuning element 206 of the multi-mode active antenna 200 to adjust the reactance of the parasitic antenna element 204 as needed to configure the multi-mode active antenna 200 in the selected antenna mode of the plurality of antenna modes in which the multi-mode active antenna 200 is configurable. As shown, a radiation pattern 210 (FIG. 3) of the multi-mode active antenna 200 when configured in the first antenna mode of the plurality of antenna modes is steered such that the radiation pattern 210 is pointed towards the first RFID tag 122. In some implementations, a null (not shown) associated with the radiation pattern 210 can be steered towards the second RFID tag 124 of the plurality of RFID tags 120. In this manner, inadvertent programming of the second RFID tag 124 while the first RFID tag 122 is being programmed can be avoided.

In some implementations, the one or more control devices 300 can provide one or more control signals associated with programming (e.g., encoding) the first RFID tag 122 when the multi-mode active antenna 200 is configured in the selected antenna mode of operation. For instance, one or more signals can be transmitted to the first RFID tag 122 via the multi-mode active antenna 200. In some implementations, the multi-mode active antenna 200 can receive one or more signals from the first RFID tag 122 when the multi-mode active antenna 200 is configured in the selected antenna mode of operation. For instance, the one or more signals the multi-mode active antenna 200 receives from the first RFID tag 122 can be indicative of the first RFID tag 122 acknowledging receipt of the one or more signals transmitted to the first RFID tag 122 via the multi-mode active antenna 200.

In some implementations, the one or more control devices 300 can be configured to obtain data indicative of one or more parameters (e.g., type) associated with the second RFID tag 124 of the plurality of RFID tags 120 subsequent to programming the first RFID tag 122 of the plurality of RFID tags 120. In this manner, the one or more control devices 300 can determine a selected antenna mode of operation for the multi-mode active antenna 200 based, at least in part, on the data indicative of the one or more parameters associated with the second RFID tag 124. For instance, as discussed above, the one or more control devices 300 can access the look-up table 308 stored on the one or more memory devices 304 to determine a selected antenna mode in which the multi-mode active antenna 200 is to be configured to communicate with the second RFID tag 124 of the plurality of RFID tags 120. For example, the look-up table 308 can, in some implementations, indicate that the multi-mode active antenna 200 is to be configured in a second antenna mode to communicate with the second RFID tag 124.

It should be appreciated that the one or more control devices 300 can be configured to provide one or more control signals associated with configuring the multi-mode active antenna 200 in the second antenna mode (e.g., selected antenna mode) of the plurality of antenna modes. As shown, a radiation pattern 212 (FIG. 4) of the multi-mode active antenna 200 when configured in the second antenna mode of the plurality of antenna modes is steered such that the radiation pattern 212 is pointed towards the second RFID tag 124. In some implementations, a null (not shown) associated with the radiation pattern 212 can be steered towards the first RFID tag 122 of the plurality of RFID tags 120. In this manner, inadvertent reprogramming of the first RFID tag 122 while the second RFID tag 124 is being programmed can be avoided.

Although the embodiment in FIGS. 3 and 4 includes only two RFID tags (e.g., first RFID tag 122 and second RFID tag 124), it should be appreciated that the RFID printer-encoder 100 can be configured to accommodate any suitable number of RFID tags. For instance, in some implementations, the plurality of RFID tags 120 can include three separate RFID tags arranged in a row (e.g., side-by-side). In such implementations, the radiation pattern of the multi-mode active antenna 200 when configured in the selected antenna mode for programming one of the three RFID tags would be pointed towards the RFID tag intended to be programmed. Additionally, one or more nulls associated with the radiation pattern would be steered towards the remaining two RFID tags to, as discussed above, prevent inadvertent programming of one of the two remaining RFID tags.

Figure 5:
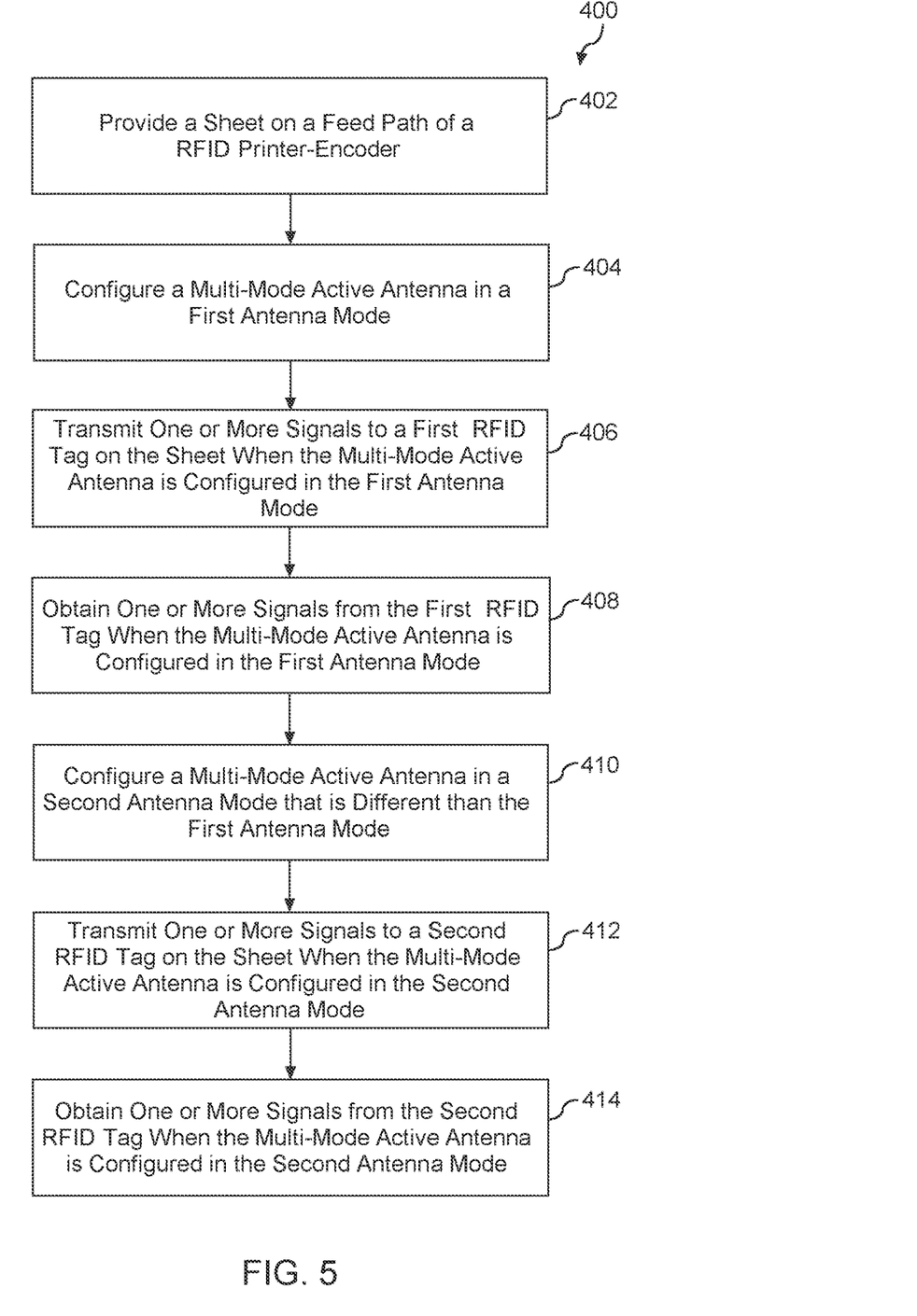
FIG. 5 depicts a flow diagram of a method for programming RFID tags using a RFID printer-encoder having a multi-mode active antenna according to example embodiments of the present disclosure.

Referring now to FIG. 5, a flow diagram of an example method 400 for programming (e.g., encoding) RFID tags using a RFID printer-encoder having a multi-mode active antenna configurable in a plurality of antenna modes is provided according to example embodiments of the present disclosure. The method 400 can be implemented, for instance, using the RFID printer-encoder discussed above with reference to FIGS. 1-3. FIG. 5 depicts steps performed in a particular order for purposes of illustration and discussion. Those of ordinary skill in the art, using the disclosures provided herein, will understand that various steps of any of the methods described herein can be adapted, omitted, rearranged, include steps not illustrated, performed simultaneously, and/or modified in various ways without deviating from the scope of the present disclosure.

At (402), the method 400 can include providing a sheet on a feed path of the RFID printer-encoder. In some implementations, the sheet can include at least a first RFID tag and a second RFID tag. In alternative implementations, the sheet can include more or fewer RFID tags.

At (404), the method 400 can include configuring, by one or more control devices, a multi-mode active antenna in a first antenna mode of a plurality of antenna modes in which the multi-mode active antenna. It should be understood that the multi-mode active antenna has a distinct radiation pattern when configured in each of the plurality of antenna modes. For instance, the radiation pattern of multi-mode active antenna when configured in the first antenna mode of the plurality of antenna modes can be steered towards the first RFID tag. Furthermore, in some implementations, a null associated with the radiation pattern of the multi-mode active antenna when configured in the first antenna mode of the plurality of antenna modes can be steered towards the second RFID tag to prevent inadvertent programming of the second RFID tag.

At (406), the method 400 can include transmitting, by the multi-mode active antenna, one or more signals to the first RFID tag when the multi-mode active antenna is configured in the first antenna mode of the plurality of antenna modes. In some implementations, the one or more signals transmitted to the first RFID tag via the multi-mode active antenna can be associated with programming (e.g., encoding) the first RFID tag.

In some implementations, the method 400 can include, at (408), obtaining, via the multi-mode active antenna, one or more signals from the first RFID tag when the multi-mode active antenna is configured in the first antenna mode of the plurality of antenna modes. For instance, in some implementations, the one or more signals obtained from the first RFID tag can be indicative of the first RFID tag acknowledging receipt of the one or more signals transmitted via the multi-mode active antenna at (406).

At (410), the method 400 can include configuring, by the one or more control devices, the multi-mode active antenna in a second antenna mode of the plurality of antenna modes to transmit a signal associated with encoding the second RFID tag. It should be understood that a radiation pattern of the multi-mode active antenna when the multi-mode active is configured in the second antenna mode is different than a radiation pattern of the multi-mode active antenna when the multi-mode active antenna is configured in the first antenna mode. For instance, the radiation pattern of multi-mode active antenna when configured in the second antenna mode of the plurality of antenna modes can be steered towards the second RFID tag. Furthermore, in some implementations, a null associated with the radiation pattern of the multi-mode active antenna when configured in the second antenna mode of the plurality of antenna modes can be steered towards the first RFID tag to avoid inadvertently reprogramming the first RFID tag.

At (412), the method 400 can include transmitting, by the multi-mode active antenna, one or more signals to the second RFID tag when the multi-mode active antenna is configured in the second antenna mode of the plurality of antenna modes.

In some implementations, the method 400 can include, at (414), obtaining, via the multi-mode active antenna, a signal from the second RFID tag when the multi-mode active antenna is configured in the second antenna mode of the plurality of antenna modes. For instance, in some implementations, the signal obtained from the second RFID tag can be indicative of the second RFID tag acknowledging receipt of the signal transmitted via the multi-mode active antenna at (412). Alternatively or additionally, the signal can include data stored in one or more memory devices associated with the second RFID tag.

Figure 6:
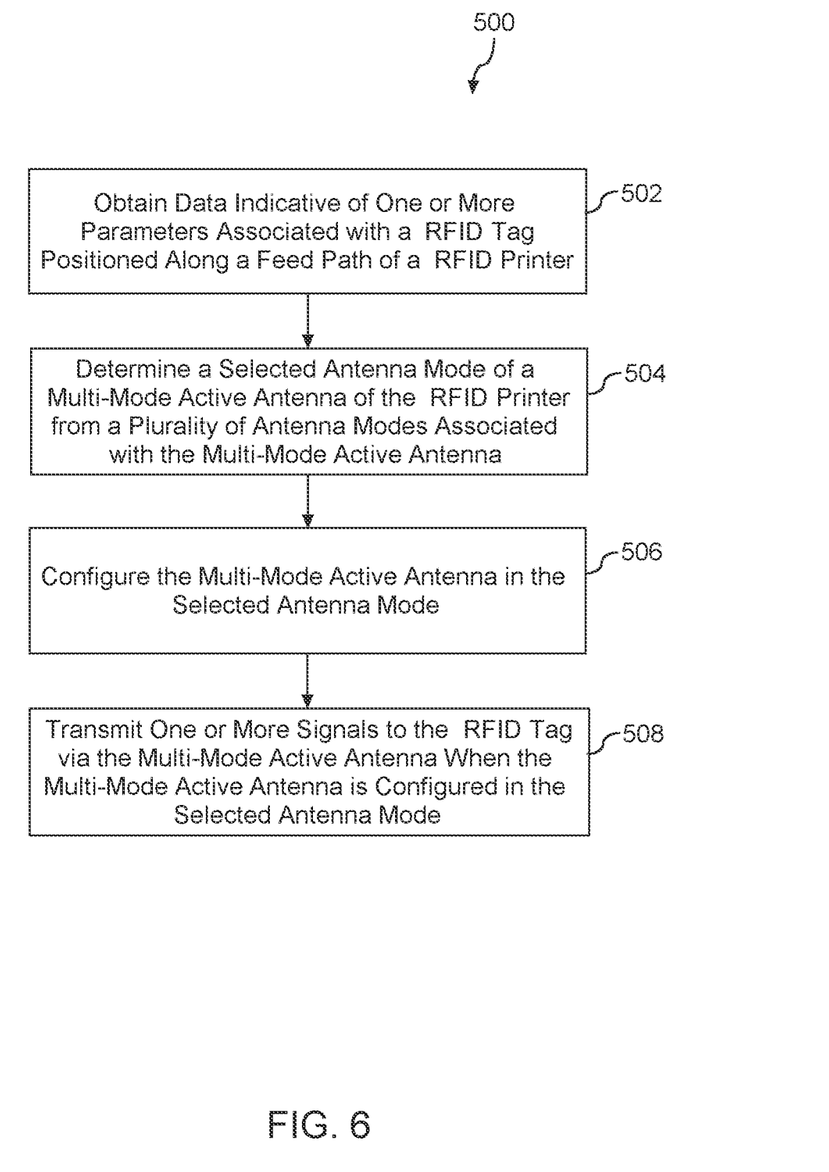
FIG. 6 depicts a flow diagram of a method for controlling operation of a multi-mode active antenna of a RFID printer-encoder according to example embodiments of the present disclosure.

FIG. 6 depicts a flow diagram of an example method 500 of controlling operation of a multi-mode active antenna of a RFID printer-encoder according to example embodiments of the present disclosure. The method 500 can be implemented, for instance, using the RFID printer discussed above with reference to FIGS. 1-4. FIG. 5 depicts steps performed in a particular order for purposes of illustration and discussion. Those of ordinary skill in the art, using the disclosures provided herein, will understand that various steps of any of the methods described herein can be adapted, omitted, rearranged, include steps not illustrated, performed simultaneously, and/or modified in various ways without deviating from the scope of the present disclosure.

At (502), the method 500 can include obtaining, by one or more control devices, data indicative of one or more parameters associated with a RFID tag positioned along a feed path of the RFID printer-encoder. In some implementations, the one or more parameters can include data indicative of the type of the RFID tag. For instance, the data can be user-input indicative of the type of the RFID tag. In some implementations, data indicative of the type of the RFID tag can include data indicative of the size of the RFID tag. Alternatively or additionally, the data indicative of one or more parameters associated with the RFID tag can include data indicative of a CQI associated with a communication link between the RFID tag and the multi-mode active antenna.

At (504), the method 500 can include determining, by the one or more control devices, a selected antenna mode for the multi-mode active antenna from a plurality of antenna modes in which the multi-mode active antenna is configurable based, at least in part, on the data obtained at (502). It should be understood that multi-mode active antenna can have a distinct radiation pattern when configured in each of the plurality of antenna modes.

At (506), the method 500 can include configuring, by the one or more control devices, the multi-mode active antenna in the selected antenna mode. Furthermore, at (508), the method 500 can include transmitting, via the multi-mode active antenna, data to the RFID device when the multi-mode active antenna is configured in the selected antenna mode.

Figure 7:
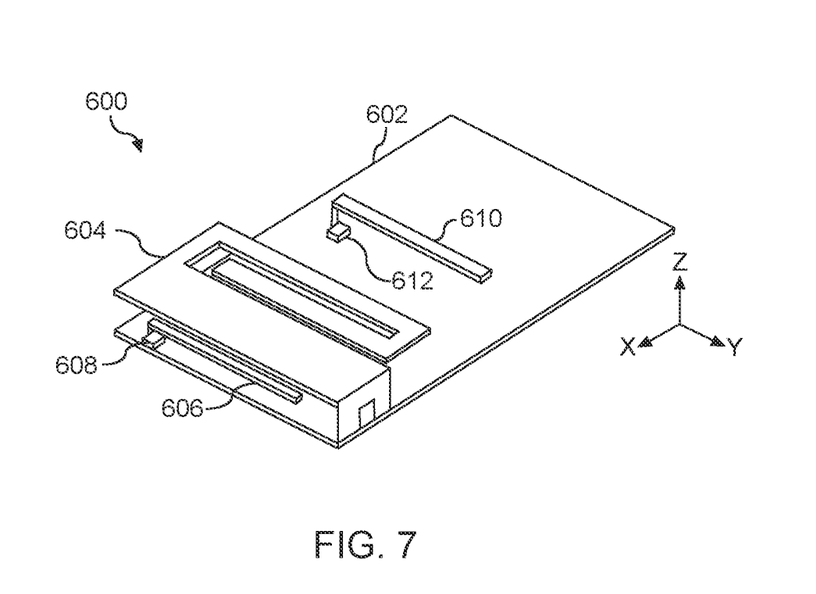
FIG. 7 depicts a multi-mode antenna according to example embodiments of the present disclosure.

FIG. 7 illustrates an example multi-mode active antenna 600 according to the present disclosure. As shown, the multi-mode active antenna 600 can include a circuit board 602 (e.g., including a ground plane) and a driven antenna element 604 disposed on the circuit board 602. An antenna volume may be defined between the circuit board 602 (e.g., and the ground plane) and the driven antenna element 604. The multi-mode active antenna 600 can include a first parasitic element 606 positioned at least partially within the antenna volume. The multi-mode active antenna 600 can further include a first tuning element 608 coupled with the first parasitic element 606. The first tuning element 608 can be a passive or active component or series of components and can be configured to alter a reactance on the first parasitic element 606 either by way of a variable reactance or shorting to ground. It should be appreciated that altering the reactance of the first parasitic element 606 can result in a frequency shift of the multi-mode active antenna 600. It should also be appreciated that the first tuning element 608 can include at least one of a tunable capacitor, MEMS device, tunable inductor, switch, a tunable phase shifter, a field-effect transistor, or a diode.

In some implementations, the multi-mode active antenna 600 can include a second parasitic element 610 disposed adjacent the driven antenna element 604 and outside of the antenna volume. The multi-mode active antenna 600 can further include a second tuning element 612. In some implementations, the second tuning element 612 can be a passive or active component or series of components and may be configured to alter a reactance on the second parasitic element 610 by way of a variable reactance or shorting to ground. It should be appreciated that altering the reactance of the second parasitic element 610 results in a frequency shift of the multi-mode active antenna 600. It should also be appreciated that the second tuning element 612 can include at least one of a tunable capacitor, MEMS device, tunable inductor, switch, a tunable phase shifter, a field-effect transistor, or a diode.

In some implementations, operation of at least one of the first tuning element 608 and the second tuning element 612 can be controlled to adjust (e.g., shift) the antenna radiation pattern of the driven antenna element 604. For example, a reactance of at least one of the first tuning element 608 and the second tuning element 612 can be controlled to adjust the antenna radiation pattern of the driven antenna element 604.

Figure 8:
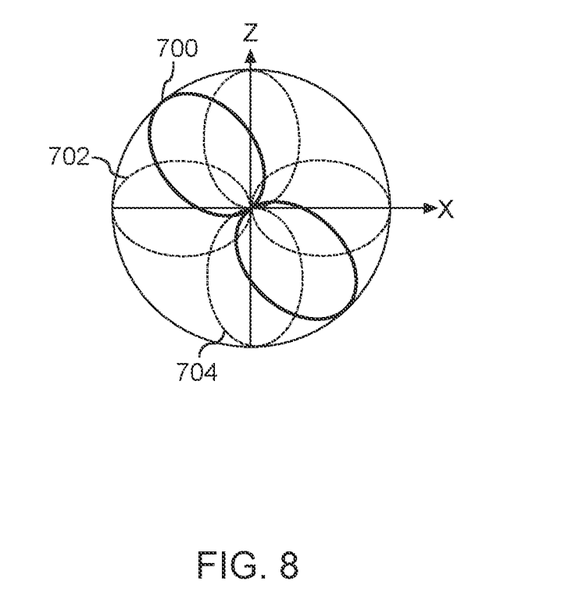
FIG. 8 depicts a two-dimensional radiation pattern associated with a multi-mode antenna according to example embodiments of the present disclosure.

FIG. 8 depicts antenna radiation patterns associated with the multi-mode active antenna 600 of FIG. 7 according to example embodiments of the present disclosure. It should be appreciated that operation of at least one of the first parasitic element 606 and the second parasitic element 610 can be controlled to configure the multi-mode active antenna 600 in a plurality of antenna modes. It should also be appreciated that the multi-mode active antenna 600 can have a distinct antenna radiation pattern or antenna polarization when configured in each of the plurality of antenna modes.

In some implementations, the multi-mode active antenna 600 can have a first antenna radiation pattern 700 when the multi-mode active antenna 600 is configured in a first antenna mode of the plurality of antenna modes. In addition, the multi-mode active antenna 600 can have a second antenna radiation pattern 702 when the multi-mode active antenna 600 is configured in a second antenna mode of the plurality of antenna modes. Furthermore, the multi-mode active antenna 600 can have a third antenna radiation pattern 704 when the multi-mode active antenna 600 is configured in a third mode of the plurality of antenna modes. As shown, the first antenna radiation pattern 700, the second antenna radiation pattern 702, and the third antenna radiation pattern 704 can be distinct from one another. In this manner, the multi-mode active antenna 600 can have a distinct radiation pattern when configured in each of the first antenna mode, second antenna mode, and third mode.

FIGS. 7 and 8 depict one example multi-mode active antenna having a plurality of antenna modes for purposes of illustration and discussion. Those of ordinary skill in the art, using the disclosures provided herein, will understand that other modal antennas and/or antenna configurations can be used without deviating from the scope of the present disclosure. As used herein a "multi-mode active antenna" refers to an antenna capable of operating in a plurality of antenna modes where each mode is associated with a distinct radiation pattern.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A radio-frequency identification (RFID) printer-encoder, comprising:
    a feed path configured to accommodate a plurality of RFID tags;
    a print head positioned along the feed path, the print head configured to print indicia on each of the plurality of RFID tags;
    a multi-mode active antenna configurable in a plurality of antenna modes, each of the plurality of antenna modes having a distinct radiation pattern; and
    one or more control devices configured to:
        obtain data indicative of one or more parameters associated with a first RFID tag of the plurality of RFID tags;
        determine one of the plurality of antenna modes as a selected antenna mode for the multi-mode active antenna based, at least in part, on the data indicative of the one or more parameters;
        configure the multi-mode active antenna in the selected antenna mode; and
        in response to configuring the multi-mode active antenna in the selected antenna mode, transmit, via the multi-mode active antenna, one or more signals to the first RFID tag, the one or more signals associated with encoding the first RFID tag,
        wherein in the selected antenna mode, a null associated with a radiation pattern of the multi-mode active antenna is steered towards a second RIFD tag of the plurality of RFID tags.

2. The RFID printer-encoder of claim 1, wherein the multi-mode active antenna is positioned along the feed path between the print head and a forward end of the feed path.

3. The RFID printer-encoder of claim 1, wherein the one or more parameters comprise data indicative of a size of the first RFID tag.

4. The RFID printer-encoder of claim 1, wherein the data indicative of one or more parameters associated with the first RFID tag comprises data indicative of a channel quality indicator (CQI) associated with a wireless communication link between the multi-mode active antenna and the first RFID tag.

5. The RFID printer-encoder of claim 4, wherein the data indicative of the CQI comprises at least one of a received signal strength indicator (RSSI), a signal-to-noise ratio (SNR), or a signal-to-interference-plus-noise ratio (SINR).

6. The RFID printer-encoder of claim 1, wherein the one or more control devices are further configured to:
    obtain, via the multi-mode active antenna, one or more signals from the first RFID tag when the multi-mode active antenna is configured in the selected antenna mode.

7. The RFID printer-encoder of claim 1, wherein the multi-mode active antenna comprises a driven antenna element and a parasitic antenna element.

8. The RFID printer-encoder of claim 7, wherein the multi-mode active antenna further comprises a tuning element configured to adjust a reactance of the parasitic antenna element.

9. The RFID printer-encoder of claim 8, wherein the tuning element comprises a switching device configured to selectively couple the parasitic antenna element to one of a plurality of different loads to adjust the reactance of the parasitic antenna element.

10. The RFID printer-encoder of claim 1, wherein the one or more parameters comprise data indicative of an encoding requirement for the first RFID tag.

11. A method of encoding RFID tags using a RFID printer-encoder having a multi-mode active antenna configurable in a plurality of antenna modes, the method comprising:
    providing a sheet on a feed path of the RFID printer-encoder, the sheet comprising at least a first RFID tag and a second RFID tag;
    configuring, by one or more control devices, the multi-mode active antenna in a first antenna mode of the plurality of antenna modes to transmit a signal associated with encoding the first RFID tag; and
    configuring, by the one or more control devices, the multi-mode active antenna in a second antenna mode of the plurality of antenna modes to transmit a signal associated with encoding the second RFID tag,
    wherein when the multi-mode active antenna is configured in the first antenna mode, the multi-mode active antenna has a first radiation pattern having a null steered towards the second RFID tag, and
    wherein when the multi-mode active antenna is configured in the second antenna mode, the multi-mode active antenna has a second radiation pattern that is different than the first radiation pattern, the second radiation pattern having a null steered towards the first RFID tag.

12. The method of claim 11, further comprising:
    transmitting, via the multi-mode active antenna, the signal associated with encoding the first RFID tag when the multi-mode active antenna is configured in the first antenna mode; and
    responsive to transmitting the signal associated with encoding the first RFID tag, obtaining, via the multi-mode active antenna, a signal from the first RFID tag.

13. A method of controlling operation of a multi-mode active antenna of a RFID printer-encoder, the method comprising:
    obtaining, by one or more control devices, data indicative of one or more parameters associated with a first RFID tag positioned along a feed path of the RFID printer-encoder;
    determining, by the one or more control devices, a selected antenna mode for the multi-mode active antenna from a plurality of antenna modes in which the multi-mode active antenna is configurable based, at least in part, on the data, each of the plurality of antenna modes having a distinct radiation pattern;
    configuring, by the one or more control devices, the multi-mode active antenna in the selected antenna mode; and
    responsive to configuring the multi-mode active antenna in the selected antenna mode, transmitting, via the multi-mode active antenna, one or more signals to the first RFID tag the one or more signals associated with encoding the RFID tag, wherein in the selected antenna mode, a null associated with a radiation pattern of the multi-mode active antenna is steered towards a second RIFD tag positioned along the feed path of the RFID printer-encoder.

14. The method of claim 13, wherein the one or more parameters comprise a type of the first RFID tag.

15. The RFID printer-encoder of claim 13, wherein the data indicative of one or more parameters associated with the first RFID tag comprises data indicative of a channel quality indicator associated with a wireless communication link between the multi-mode active antenna and the first RFID tag.

16. The method of claim 13, further comprising:
obtaining, via the multi-mode active antenna, one or more signals from the first RFID tag when the multi-mode active antenna is configured in the selected antenna mode.

17. The method of claim 13, wherein determining the selected antenna mode for the multi-mode active antenna from the plurality of antenna modes comprises accessing, by the one or more control devices, a look-up table storing the selected antenna mode for each of a plurality of RFID tags.

* * * * *